(No Model.) 3 Sheets—Sheet 1.

M. M. SUPPES.
PROCESS OF MAKING RAILROAD RAILS.

No. 460,096. Patented Sept. 22, 1891.

WITNESSES:
Edward C. Rowland.
Francis P. Reilly.

INVENTOR
Max M. Suppes
BY
P. N. Townsend
ATTORNEY (No Model.) 3 Sheets—Sheet 2.

M. M. SUPPES.
PROCESS OF MAKING RAILROAD RAILS.

No. 460,096. Patented Sept. 22, 1891.

WITNESSES:
Edward C. Rowland.
Francis P. Reilly.

INVENTOR
Max. M. Suppes
BY
ATTORNEY (No Model.)  3 Sheets—Sheet 3.
M. M. SUPPES.
PROCESS OF MAKING RAILROAD RAILS.
No. 460,096.  Patented Sept. 22, 1891.
Fig 14.
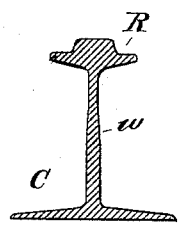
Fig 15.
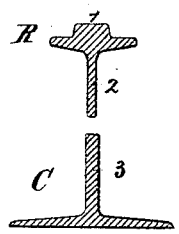
Fig. 16.
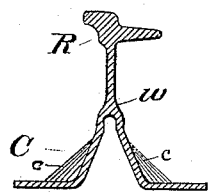
Fig. 17.
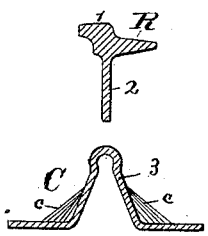
Fig 18.  Fig 19.  Fig 20.  Fig 21.
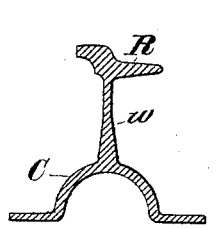 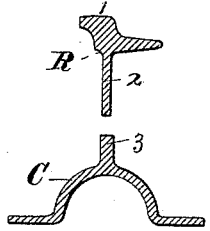 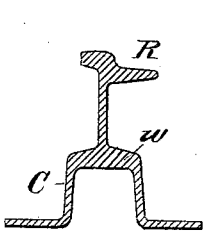 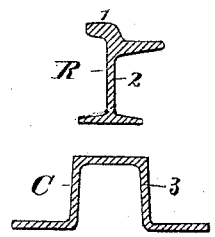
WITNESSES:
Edward C. Rowland.
Francis V. Reilly.
INVENTOR
Max. M. Suppes
BY
P. N. Voorhees
ATTORNEY.

UNITED STATES PATENT OFFICE.

MAXIMILIAN M. SUPPES, OF JOHNSTOWN, PENNSYLVANIA, ASSIGNOR TO THE JOHNSON COMPANY, OF SAME PLACE.

PROCESS OF MAKING RAILROAD-RAILS.

SPECIFICATION forming part of Letters Patent No. 460,096, dated September 22, 1891.

Application filed February 28, 1891. Serial No. 383,153. (No model.)

*To all whom it may concern:*

Be it known that I, MAXIMILIAN M. SUPPES, of Johnstown, in the county of Cambria and State of Pennsylvania, have invented a new and useful Process of Making Railroad-Rails, which invention is fully set forth and illustrated in the following specification and accompanying drawings.

The object of this invention is to provide girder-rails, more particularly for use as street-railway-track rails of considerable depth, and to produce rails that may, if desired, be placed directly in position in the road without the medium of supporting-chairs.

The invention will first be described in detail and then particularly set forth in the claims.

Figure 1:
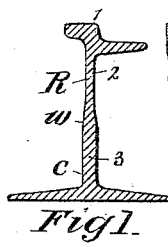
Figure 2:
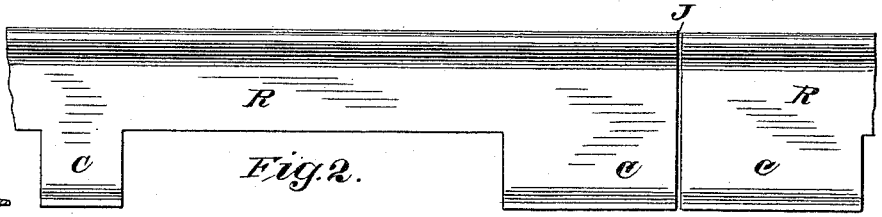
Figure 3:
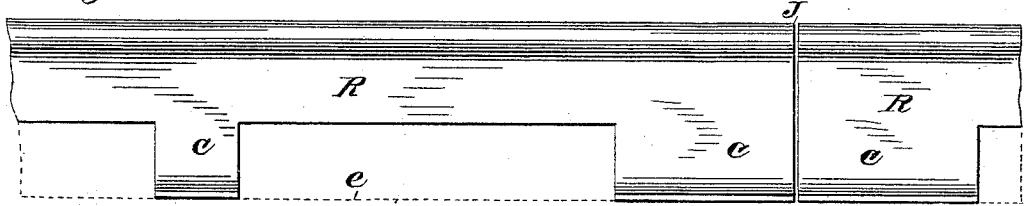
Figure 4:
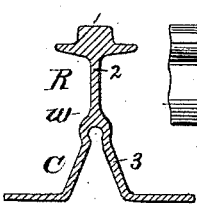
Figure 5:
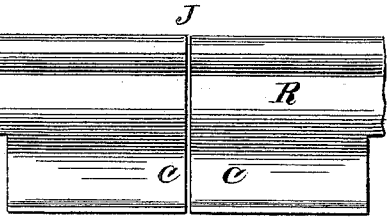
Figure 6:
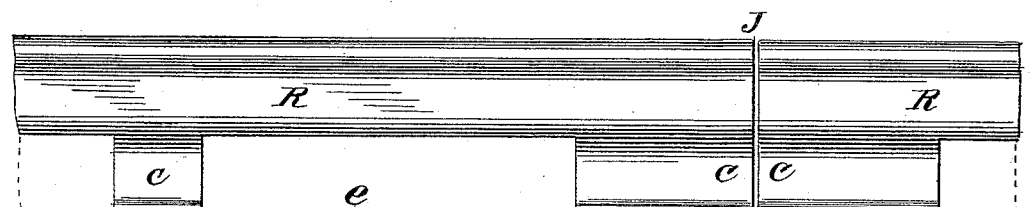
Figure 13:
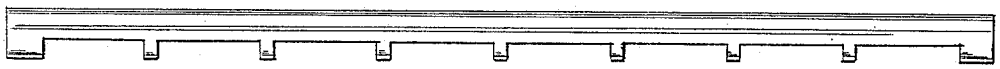
Figures 7, 8:
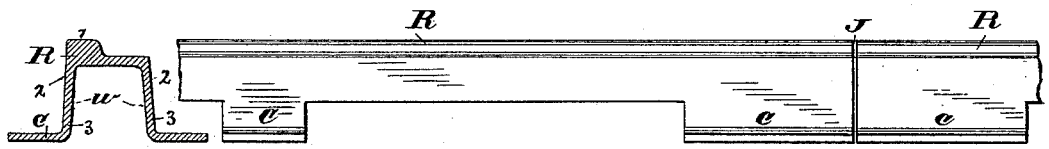
Figure 9:
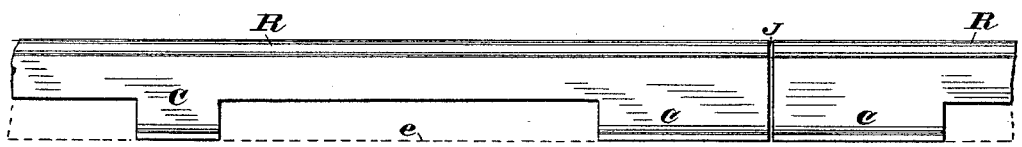
Figures 10, 11:
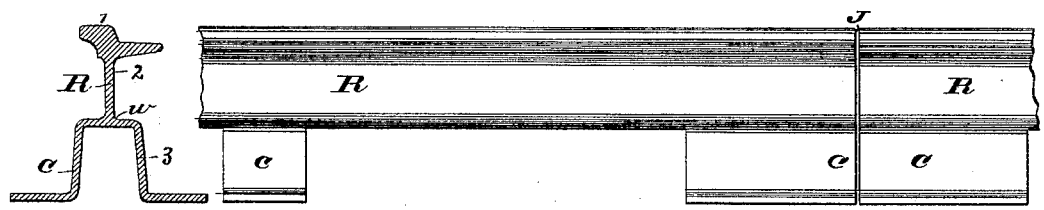
Figure 12:
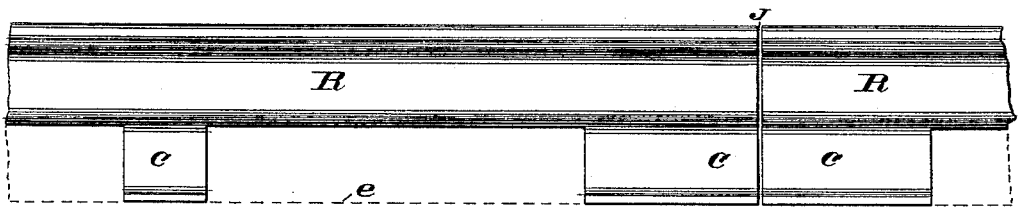

In the accompanying drawings, Figure 1 shows one form of girder-rail and base or support in cross-section made by the process herein described. Fig. 2 is a side elevation of Fig. 1, showing also the junction of two contiguous rails. Fig. 3 is a side elevation similar to Fig. 2, the dotted lines between the supports indicating the bottom line of the supports which would be formed were the base or support continuous, but from which the metal may be abstracted. Fig. 4 shows in cross-section another form of girder-rail and base or support. Fig. 5 is a side elevation of Fig. 4, showing also the junction of two contiguous rails. Fig. 6 is a side elevation similar to Fig. 5, the dotted lines being shown for the purpose indicated in describing Fig. 3. Fig. 7 shows in cross-section another form of rail and base or support. Fig. 8 is a side elevation of Fig. 7, showing the junction of two contiguous rails. Fig. 9 is a side elevation similar to Fig. 8, the dotted lines being shown for the purpose indicated in describing Figs. 3 and 6. Fig. 10 shows in cross-section another form of rail and base or support. Fig. 11 is a side elevation of Fig. 10, showing the junction of two contiguous rails. Fig. 12 is a side elevation similar to Fig. 11, the dotted lines being shown for the purpose indicated in describing Figs. 3, 6, and 9. Fig. 13 shows in side elevation a girder-rail of full length—say thirty feet—with its supports at intervals. Figs. 14 to 21, inclusive, show in cross-section modifications in shape of heads and supports of girder-rails before and after being united, as hereinafter described.

In said figures the several parts are respectively indicated by reference letters and numbers, as follows:

The letter R indicates a girder-rail, which may be of any suitable form, several forms being shown in the drawings, the number 1 indicating the head, and 2 the web, of the same. The letters C indicate the base or supports for said rail. Said base or supports may be of any suitable form, Figs. 14 to 21, inclusive, showing a variety of forms. As shown in some of the figures, these supports are provided with an upward extension 3, although my invention may be used whether or not there be an upward extension to the support. As shown in the figures, the rail proper is formed throughout with head and web or webs, while the supports are provided at intervals only. These supports may be at any desired distance apart, or even might be made continuous without departing from my invention, except wherein the supports at intervals are specifically claimed.

The process of making the completed rail is as follows: A rail is first rolled or otherwise formed into the desired shape. If rolled, it is rolled in the usual manner from a pile, bloom, or ingot. The base or supports C are then formed into the desired shape by any method or process, such as rolling, casting, forging, or otherwise; or some of said supports may be made by one method or process and some by another. If the supports are produced by rolling, they are rolled in long lengths and cut off to the desired length of the support required. The rail and supports having been thus formed, they are united together by "welding," in the ordinary acceptance of the term, in connection with pressure or force, or that species of welding called "autogenous welding" or burning. I prefer electric welding as an efficient means of uniting the parts together. The letter *w* indicates the points of union between rail and support. Thus a rail may be formed which when delivered from the shop is ready to be placed in the track and secured to the cross-ties without the intervention of any intermediate or detachable supports.

In street-railroad practice it has been found desirable to use a rail of great depth and a base or supports of great depth, no matter what the shape of the latter, and by the process herein described—by forming the base or supports and the rail separately and then welding the two together, so as to form an integral structure—I obtain the desired result. If additional strength is desired in the supports C, braces c may be stamped out of the same, as shown in Figs. 16 and 17, when the shapes of the supports permit.

Having thus fully described my said invention, I claim—

1. The hereinbefore-described process, which consists in forming a rail and a base or support separately and welding said rail and base or support together.

2. The process of making an improved railroad-rail, which consists in forming a rail provided with a head and web and welding a support or base to said web.

3. The process of making an improved railroad-rail, which consists in rolling a rail provided with a head and web and welding a base or support to said web.

4. The hereinbefore-described process, which consists in rolling a rail and welding a base or support to said rail at intervals throughout the length of the rail.

5. The hereinbefore-described process, which consists in rolling a rail provided with a head and web and welding a base or support to said web at intervals throughout the length of the rail.

6. The process of making an improved railroad-rail, which consists in forming the rail proper without base or support and welding a base or support thereto.

7. The process of making an improved railroad-rail, which consists in forming the rail proper without base or support and welding a base or support to said rail at intervals throughout its length.

MAXIMILIAN M. SUPPES.

Witnesses:
ROBT. S. MURPHY,
A. J. BRYAN.